(12) United States Patent
Nakajima et al.

(10) Patent No.: US 11,830,238 B2
(45) Date of Patent: Nov. 28, 2023

(54) IDENTIFICATION DEVICE, IDENTIFICATION METHOD, AND IDENTIFICATION PROGRAM

(71) Applicant: NIPPON TELEGRAPH AND TELEPHONE CORPORATION, Tokyo (JP)

(72) Inventors: Asuka Nakajima, Musashino (JP); Eitaro Shioji, Musashino (JP); Kunio Hato, Musashino (JP); Mitsuaki Akiyama, Musashino (JP); Toshiki Shibahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/778,462

(22) PCT Filed: Nov. 22, 2019

(86) PCT No.: PCT/JP2019/045885
§ 371 (c)(1),
(2) Date: May 20, 2022

(87) PCT Pub. No.: WO2021/100209
PCT Pub. Date: May 27, 2021

(65) Prior Publication Data
US 2022/0415017 A1   Dec. 29, 2022

(51) Int. Cl.
*G06V 10/74* (2022.01)
*G06V 10/26* (2022.01)
(Continued)

(52) U.S. Cl.
CPC ......... *G06V 10/761* (2022.01); *G06V 10/273* (2022.01); *G06V 10/426* (2022.01); *G06V 10/757* (2022.01)

(58) Field of Classification Search
None
See application file for complete search history.

(56) References Cited

U.S. PATENT DOCUMENTS 6,134,342 A   10/2000 Doke et al.
10,007,863 B1 *  6/2018 Pereira ................. G06V 10/764
(Continued)

FOREIGN PATENT DOCUMENTS

JP    7-190884 A      7/1995
WO   2017/006852 A1   1/2017

OTHER PUBLICATIONS

Lebrun et al., "Image retrieval with graph kernel on regions," 2008 19th International Conference on Pattern Recognition, Jan. 23, 2009 (Year: 2009).*

(Continued)

*Primary Examiner* — Soo Shin
(74) *Attorney, Agent, or Firm* — XSENSUS LLP (57) ABSTRACT

An identification apparatus includes processing circuitry configured to determine whether or not a first image and a second image are similar based on feature points extracted from each of the first image and the second image, and determine whether or not the first image and the second image are similar by comparing neighborhood graphs generated for each of the first image and the second image, the feature points being as nodes.

16 Claims, 11 Drawing Sheets

(51) Int. Cl.
*G06V 10/75* (2022.01)
*G06V 10/426* (2022.01)

(56) References Cited

U.S. PATENT DOCUMENTS

| | | | | |
|---|---|---|---|---|
| 11,544,535 | B2* | 1/2023 | Lee | G06N 3/047 |
| 2011/0295515 | A1* | 12/2011 | Grady | A61B 5/4064 |
| | | | | 702/19 |
| 2016/0196672 | A1* | 7/2016 | Chertok | G06N 3/045 |
| | | | | 382/156 |
| 2017/0243042 | A1* | 8/2017 | Walch | G06V 40/70 |
| 2018/0197044 | A1 | 7/2018 | Wu et al. | |
| 2018/0232689 | A1* | 8/2018 | Minvielle | G06T 7/194 |
| 2018/0307942 | A1* | 10/2018 | Pereira | G06T 7/337 |
| 2020/0394413 | A1* | 12/2020 | Bhanu | A63B 67/002 |

OTHER PUBLICATIONS

Karas, "80+ OEMs Verified Vulnerable To Hikvision Backdoor", IPVM, Available Online At: https://ipvm.com/reports/hik-oem-vuln, Sep. 22, 2017, 12 pages.

Nakajima, "OEM Finder: Hunting Vulnerable OEM IoT Devices at Scale", Black Hat Europe 2019, Available Online At: https://www.blackhat.com/eu-19/briefinges/schedule/#oem-finder-hunting-vulnerable-oem-iot-devices-at-scale-17982, Dec. 2-5, 2019, 7 pages.

Zhou et al., "Image Similarity Retrieval Using Graph Description and Matching", IEICE Technical Report, vol. 91, No. 299, Oct. 25, 1991, pp. 9-14 (9 pages including English Abstract).

* cited by examiner

| | FEATURE POINT 1 | FEATURE POINT 2 | FEATURE POINT 3 | FEATURE POINT 4 | FEATURE POINT 5 | FEATURE POINT 6 | ... | FEATURE POINT n |
|---|---|---|---|---|---|---|---|---|
| COORDINATE (x, y) | (253.94,69.12) | (277.01,69.93) | (25.88, 92.25) | (264.31,96.16) | (81.62,100.22) | (266.92,100.96) | | (108.95,109.17) |
| FEATURE AMOUNT | 0.01422952 | 0.01178384 | 0.01819269 | 0.08033819 | 0.02667051 | 0.08096815 | ... | 0.01618592 |
| | 0.03861904 | 0.03498758 | 0.00495848 | 0.01203451 | 0.02278431 | 0.04146945 | | 0.0448265 |
| | 0.01422965 | 0.01384677 | 0.02121617 | 0.09321696 | 0.04675487 | 0.12166014 | | 0.03077653 |
| | 0.03961904 | 0.0423955 | 0.01998713 | 0.01691705 | 0.04243251 | 0.06291688 | | 0.05717433 |
| | 0.05536934 | 0.06993958 | 0.03196206 | 0.13227342 | 0.15697427 | 0.06890663 | | 0.01046855 |
| | 0.15490140 | 0.12218212 | 0.02552721 | 0.05472784 | 0.11618193 | 0.11495122 | | 0.04663539 |
| | 0.05547552 | 0.07018914 | 0.03330532 | 0.14125218 | 0.161685 | 0.11085482 | | 0.04508518 |
| | 0.15490143 | 0.1347744 | 0.03740118 | 0.11399957 | 0.12553544 | 0.15486781 | | 0.09847713 |
| | 0.00778712 | 0.14001328 | -0.0434354 | 0.0483973 | 0.00835698 | 0.01769778 | | 0.00222185 |
| | -0.1624022 | 0.19398498 | 0.01984842 | 0.118085 | 0.00950155 | 0.15338524 | | 0.03486423 |
| | 0.05683756 | 0.14061328 | 0.04466477 | 0.13804033 | 0.04951429 | 0.09888165 | | 0.02415218 |
| | 0.16359837 | 0.20140076 | 0.04315739 | 0.14773384 | 0.03627939 | 0.19027346 | | 0.12559944 |
| | 0.01688046 | 0.04716036 | 0.02852947 | 0.00410995 | -0.0322764 | 0.00359151 | | 0.00045353 |
| | 0.04630855 | 0.05802248 | -0.00033021 | 0.03778464 | 0.0189885 | 0.03423136 | | 0.01691508 |
| | 0.02668607 | 0.04716038 | 0.02862096 | 0.08442374 | 0.03245063 | 0.0746658 | | 0.01789597 |
| | 0.05531295 | 0.05811842 | 0.02979104 | 0.08145227 | 0.01930864 | 0.10847367 | | 0.09695494 |
| | 0.04656729 | 0.05911746 | 0.06113571 | 0.13759297 | 0.03798036 | 0.08162194 | | 0.01357395 |
| | -0.1359596 | 0.12638466 | 0.07056396 | 0.03548188 | 0.16123092 | 0.00258434 | | 0.04340975 |
| | 0.10880661 | 0.06105654 | 0.05117438 | 0.1803522 | 0.04502982 | 0.22098149 | | 0.02315429 |
| | 0.26106623 | 0.13891557 | 0.07331298 | 0.04189533 | 0.16321616 | 0.0430855 | | 0.05449552 |
| | 0.00320438 | 0.05466976 | 0.13868515 | 0.23518147 | 0.10711557 | -0.20357154 | | 0.15393201 |
| | 0.04286316 | 0.28999639 | 0.0178329 | 0.06197942 | 0.05815008 | 0.08011062 | | 0.02655332 |
| | 0.11697389 | 0.06186237 | 0.1595142 | 0.2773802 | 0.2092904 | 0.214846 | | 0.16424039 |
| | 0.41746002 | 0.31187157 | 0.12557526 | 0.12449276 | 0.27055308 | 0.20427841 | | 0.23440976 |
| | 0.02869463 | 0.00614298 | 0.02400672 | 0.14987016 | 0.17801815 | 0.13791724 | | 0.01590558 |
| | 0.08379194 | 0.19058906 | 0.03243329 | 0.14985786 | 0.03992036 | 0.14724853 | | 0.12931235 |
| | 0.09582514 | 0.12085328 | 0.13433336 | 0.22128764 | 0.19186737 | 0.18704823 | | 0.11550448 |
| | 0.3232933 | 0.31225449 | 0.13417412 | 0.17636789 | 0.14132442 | 0.24203579 | | 0.46879841 |
| | 0.02731214 | 0.11765101 | 0.01784102 | 0.0888497 | 0.02802929 | 0.00286182 | | 0.01866737 |
| | 0.08096426 | 0.18658118 | 0.0717751 | 0.04465279 | 0.02075988 | 0.02065559 | | 0.01970873 |
| | 0.07021406 | 0.18237486 | 0.04027593 | 0.09612466 | 0.04215652 | 0.1727542 | | 0.06178838 |
| | 0.1178792 | 0.1998852 | 0.0751969 | 0.05084179 | 0.02843652 | 0.1101722 | | 0.30861235 |
| | 0.09626871 | 0.0999678 | 0.08367046 | 0.0785895 | 0.04929203 | 0.15035551 | | 0.04304913 |
| | 0.11401574 | 0.13043991 | 0.16771767 | 0.0502191 | 0.20592923 | 0.08747897 | | 0.06495218 |
| | 0.14042608 | 0.09272428 | 0.06367902 | 0.1854678 | 0.04969418 | 0.18752792 | | 0.05697219 |
| | 0.16287993 | 0.13359815 | 0.16772056 | 0.1583623 | 0.20592923 | 0.10508769 | | 0.0995115 |
| | 0.00080973 | 0.01308955 | -0.1608964 | 0.04277016 | 0.01353523 | 0.01113127 | | 0.14786911 |
| | 0.04128461 | 0.05005632 | 0.36864984 | 0.06040071 | 0.38833844 | 0.09599805 | | 0.2324543 |
| | 0.11434424 | 0.05888098 | 0.11842705 | 0.18311316 | 0.0593815 | 0.10325257 | | 0.16030511 |
| | 0.29711285 | 0.17578438 | 0.38052559 | 0.27045107 | 0.19420471 | 0.18927382 | | 0.27995667 |
| | 0.01521923 | 0.03267615 | 0.03219706 | 0.05583114 | 0.01937602 | 0.04483685 | | 0.01433765 |
| | 0.02040148 | 0.01442109 | 0.40444157 | 0.07934017 | 0.24923295 | 0.16073741 | | 0.25098661 |
| | 0.10731253 | 0.0986675 | 0.07927294 | 0.09640500 | 0.14532222 | 0.06232881 | | 0.08968417 |
| | 0.25026488 | 0.25427338 | 0.41107047 | 0.22642404 | 0.26610577 | 0.16361333 | | 0.33161184 |
| | 0.05077698 | 0.09330009 | 0.05397442 | 0.03434436 | -0.0626537 | 0.08114631 | | 0.01854684 |
| | 0.14032915 | 0.09152159 | 0.2538971 | 0.0880679 | 0.00669063 | 0.08643807 | | 0.1252722 |
| | 0.0726115 | 0.16969085 | 0.06567863 | 0.06578234 | 0.07314451 | 0.10657893 | | 0.02392297 |
| | 0.15040418 | 0.16718519 | 0.2538971 | 0.11820372 | 0.06583784 | 0.09894545 | | 0.14252974 |
| | 0.00746311 | 0.00100387 | 0.00447708 | 0.08222763 | -0.0006034 | 0.02222685 | | 0.07837381 |
| | 0.01502193 | 0.02046528 | 0.01635296 | 0.10355879 | 0.00408685 | 0.06379216 | | 0.04539463 |
| | 0.06315109 | 0.02546389 | 0.00453832 | 0.10491511 | 0.0008034 | 0.08696763 | | 0.07960603 |
| | 0.02871291 | 0.03498445 | 0.0163879 | 0.1337668 | 0.00408685 | 0.08033135 | | 0.05275841 |
| | 0.11857031 | -0.1268387 | 0.00516846 | -0.01887658 | 0.00097755 | 0.10909823 | | 0.05336351 |
| | 0.04981871 | 0.09677725 | 0.0518796 | -0.0096397 | 0.01415638 | -0.1978095 | | 0.07531094 |
| | 0.12943892 | 0.13285339 | 0.0054301 | 0.13969458 | 0.00154874 | 0.11181006 | | 0.08702553 |
| | 0.08346781 | 0.09713639 | 0.0518796 | 0.24051575 | 0.01451268 | 0.20069318 | | 0.07531094 |
| | 0.13847122 | 0.07183296 | 0.00342483 | 0.01434819 | 0.08212119 | 0.01788117 | | -0.0426758 |
| | 0.09486257 | 0.09422037 | 0.05809803 | 0.17239584 | 0.00866156 | 0.18417044 | | 0.19673055 |
| | 0.15805714 | 0.12092205 | 0.00444242 | 0.04548078 | 0.0625737 | 0.02542361 | | 0.04375206 |
| | 0.16177374 | 0.10913811 | 0.05808803 | 0.20367283 | 0.04938636 | 0.18833878 | | 0.19754384 |
| | 0.00241072 | 0.00848166 | 0.00516014 | 0.04311738 | 0.13641037 | 0.02066758 | | 0.0081191 |
| | 0.04545052 | 0.00864062 | 0.02248028 | 0.10657668 | 0.00054882 | 0.12629434 | | 0.0589019 |
| | 0.05961114 | 0.11312476 | 0.00516094 | 0.04347331 | 0.13665436 | 0.02191252 | | 0.00953009 |
| | 0.06123297 | 0.03602387 | 0.02248028 | 0.11708859 | 0.06271274 | 0.14319184 | | 0.06911932 |

Fig. 4

| | FEATURE POINT 1 | FEATURE POINT 2 | FEATURE POINT 3 | FEATURE POINT 4 | FEATURE POINT 5 | FEATURE POINT 6 | ... | FEATURE POINT n |
|---|---|---|---|---|---|---|---|---|
| COORDINATE (x, y) | (259.36, 34.83) | (245.31, 36.93) | (236.73, 42.49) | (224.97, 48.11) | (230.35, 47.91) | (216.22, 55.51) | | (308.87, 69.09) |
| FEATURE AMOUNT | (column of numeric feature values) | (column of numeric feature values) | (column of numeric feature values) | (column of numeric feature values) | (column of numeric feature values) | (column of numeric feature values) | ... | (column of numeric feature values) |

| | FEATURE POINTS 36 EXTRACTED FROM IMAGE OBTAINED BY CAPTURING PRODUCT APPEARANCE OF ORIGINAL PRODUCT | FEATURE POINTS 33 EXTRACTED FROM IMAGE OBTAINED BY CAPTURING PRODUCT APPEARANCE OF INSPECTION TARGET PRODUCT |
|---|---|---|
| COORDINATE (x, y) | (72.58,150.16) | (88.31,159.86) |
| FEATURE AMOUNT | 0.00545281 | 0.00596866 |
| | -0.01557085 | 0.04095928 |
| | 0.0190443 | 0.00612672 |
| | 0.02348156 | 0.04175584 |
| | 0.00528188 | 0.03390546 |
| | -0.02086895 | -0.00686099 |
| | 0.01745228 | 0.06050007 |
| | 0.02949347 | 0.0704193 |
| | 0.01216624 | 0.03024687 |
| | -0.03683366 | -0.05802235 |
| | 0.01454809 | 0.03615986 |
| | 0.04219214 | 0.0604491 |
| | -0.00726582 | 0.00828609 |
| | -0.02597195 | -0.01958018 |
| | 0.00896957 | 0.00866706 |
| | 0.02621606 | 0.02045365 |
| | -0.01518502 | 0.00246744 |
| | 0.11101153 | 0.00908868 |
| | 0.08792196 | 0.00488247 |
| | 0.1598354 | 0.0168366 |
| | -0.10661364 | 0.03629463 |
| | -0.00101838 | 0.16100135 |
| | 0.15285809 | 0.17874186 |
| | 0.22053479 | 0.27183394 |
| | 0.09167515 | -0.01459376 |
| | 0.01164244 | 0.26272434 |
| | 0.14364903 | 0.1538775 |
| | 0.20840605 | 0.45506606 |
| | 0.05216827 | 0.02506499 |
| | 0.10372766 | 0.04242801 |
| | 0.06128838 | 0.07953551 |
| | 0.1424306 | 0.13555445 |
| | -0.04790421 | 0.00260385 |
| | 0.15120304 | -0.01566262 |
| | 0.05404002 | 0.00822973 |
| | 0.16244847 | 0.01573165 |
| | -0.0758039 | 0.31556556 |
| | 0.38809622 | 0.06506038 |
| | 0.10408097 | 0.32117996 |
| | 0.40735778 | 0.08020092 |
| | 0.07491605 | -0.05728452 |
| | 0.37547854 | 0.17071067 |
| | 0.09572072 | 0.19669674 |
| | 0.38509217 | 0.17071067 |
| | 0.05492319 | -0.12448934 |
| | 0.15382434 | 0.05598595 |
| | 0.0549237 | 0.13807073 |
| | 0.16011196 | 0.09384958 |
| | -0.00064876 | 0.00942344 |
| | 0.00256646 | -0.00891898 |
| | 0.00065771 | 0.0140837 |
| | 0.00256719 | 0.01170966 |
| | -0.00129438 | 0.23239323 |
| | 0.01464701 | 0.02579992 |
| | 0.00171951 | 0.2330126 |
| | 0.01464701 | 0.03135793 |
| | 0.00134499 | 0.01431951 |
| | 0.01389127 | 0.0128752 |
| | 0.00156361 | 0.0507969 |
| | 0.01389127 | 0.01289979 |
| | 0.00056423 | -0.12592585 |
| | 0.00245596 | 0.06272745 |
| | 0.00058449 | 0.12662247 |
| | 0.00245596 | 0.06724905 |

Fig. 7

| | |
|---|---|
| NUMBER OF FEATURE POINTS EXTRACTED FROM ORIGINAL IMAGE (O) | 256 |
| NUMBER OF FEATURE POINTS EXTRACTED FROM INSPECTION TARGET IMAGE (T) | 188 |
| NUMBER OF SETS OF ANALOGOUS FEATURE POINTS (n) | 104 |

LOCAL SIMILARITY DEGREE $$\frac{n}{O} = \frac{104}{256} = \text{SIMILARITY DEGREE } 40.6\%$$

IDENTIFICATION DEVICE, IDENTIFICATION METHOD, AND IDENTIFICATION PROGRAM

CROSS-REFERENCE TO RELATED APPLICATION

The present application is based on PCT filing PCT/JP2019/045885, filed Nov. 22, 2019, the entire contents of which are incorporated herein by reference.

TECHNICAL FIELD

The present invention relates to an identification apparatus, an identification method, and an identification program.

BACKGROUND ART

A method for manufacturing products called Original Equipment Manufacturer (OEM) is known. OEM products are manufactured by companies, which are suppliers of products, provided to another company, and sold under the brand name of the company to which the OEM product is provided.

This OEM manufacturing method has recently been adopted in many industries and companies because product manufacturing costs can be reduced. The same applies to the IT industry. Even IT devices (network cameras or routers), which are commonly utilized, are made by the OEM manufacturer.

There is also a case in which one OEM product supplier company provides a product, which is sold under its name to a plurality of companies (hereinafter, an original product), as an OEM product having the same design. It is known that this provided OEM product only replaces the brand logo that has been printed on the device, and some are partially customized in and out of the device.

This OEM manufacturing method is known to have a problem that if a defect, such as vulnerability, has been found in the firmware of products which are designed and sold by the OEM product supplier company, similar vulnerabilities are often found in similarly designed. OEM products.

Indeed, a study conducted by the research company IPVM in 2017 (See, for example, NPL 1.) reports that vulnerabilities found in products of OEM product supplier companies have also been found in products of equal to or greater than 80 companies offered OEM products.

Herein, normally, it is necessary to give attention not only to the original product but also to the user of the OEM product containing vulnerability in use. However, because of business reasons and the like, OEM product marketers often do not promulgate their products to be OEM products, and thus, even if there was similar vulnerability to the original product in their products, it was often not published and cautioned.

CITATION LIST

Non Patent Literature

NPL 1: 80+ OEMs Verified Vulnerable To Hikvision Backdoor [online], [Search on Nov. 15, 2019], Internet (https://ipvm.com/reports/hik-oem-vuln)

SUMMARY OF THE INVENTION

Technical Problem

However, the related art has a problem that it may be difficult to efficiently identify OEM products. In the investigation described in NPL 1, an OEM product is identified by manually inspecting a label or the like of the product.

Means for Solving the Problem in order to solve above-described problem and to achieve an object, an identification apparatus includes: processing circuitry configured to: determine whether or not a first image and a second image are similar based on feature points extracted from each of the first image and the second image; and determine whether or not the first image and the second image are similar by comparing neighborhood graphs generated for each of the first image and the second image, the feature points being as nodes.

Effects of the Invention

According to the present invention, an OEM product can be efficiently identified.

BRIEF DESCRIPTION OF DRAWINGS

FIG. 3 is a diagram illustrating an example of coordinates and feature amounts of feature points of an original image.
FIG. 4 is a diagram illustrating an example of coordinates and feature amounts of feature points of an inspection target image.
FIG. 6 is a diagram illustrating an example of coordinates and feature amounts of analogous feature points.

DESCRIPTION OF EMBODIMENTS

Embodiments of an identification apparatus, an identification method and an identification program will be described in detail with reference to the drawings. The present invention is not limited to the embodiments described below.

First Embodiment

Configuration

Figure 1:
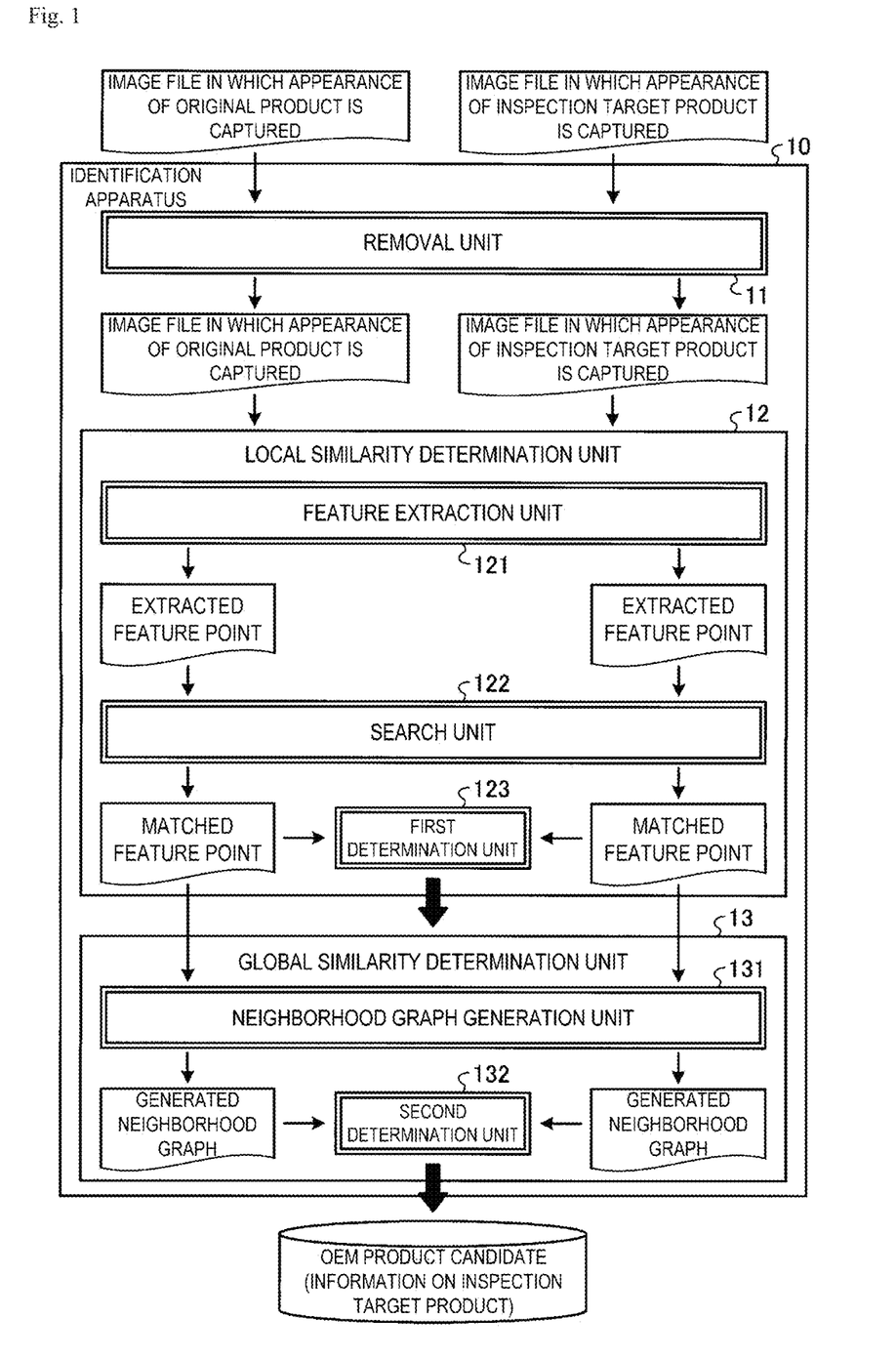
FIG. 1 is a diagram illustrating a configuration example of an identification apparatus.

As illustrated in FIG. 1, an image file showing the appearance of an original product and an image file showing the appearance of an inspection target product are inputted into an identification apparatus 10. The image of each image file is an image captured by a camera or the like. In the following description, the image with the appearance of the original product is referred to as an original image. Moreover, the image with the appearance of the inspection target product is referred to as an inspection target image. Furthermore, the original image is one example of a first image. Moreover, the inspection target image is one example of a second image.

The identification apparatus 10 determines whether or not the product captured in the inspection target image is similar to the product captured in the original image. In accordance with a determination that the products are similar, the inspection target product is identified as a candidate for the OEM product, and the product information is outputted. For example, the identification apparatus 10 outputs a feature amount extracted from the inspection target image.

The identification apparatus 10 has a removal unit 11, a local similarity determination unit 12, and a global similarity determination unit 13. Moreover, the local similarity determination unit 12 has a feature point extraction unit 121, a search unit 122, and a first determination unit 123. Furthermore, the global similarity determination unit 13 has a neighborhood graph generation unit 131 and a second determination unit 132.

The removal unit 11 removes a logo of the predetermined product captured in the image from at least one of the original image or the inspection target image. For example, the removal unit 11 removes the logo for both the original image and the inspection target image by masking a region that is recognized to have a logo with an image of a predetermined size that is aligned with the region.

An OEM product may be sold with a different brand logo from the original product. Thus, it is a matter of course that the features of the portions of the brand logo in the original image and the inspection target image are different from each other, and if the images are compared as they are, similarity determination accuracy may be deteriorated. The removal unit 11 can pre-remove such a brand logo so that features can be compared from only the object appearances of the products in a subsequent similarity determination process.

The removal unit 11 can fill and completely mask the portion of the brand logo in the image with the same shape, color and size to remove the brand logo from both images. Alternatively, the removal unit 11 may remove the brand logo by a method described in Reference 1 (Wei-Qi Yan, Jun Wang, Mohan S. Kankanhalli, Automatic video logo detection and removal, Multimedia Systems, v.10. n.5, p. 379-391, August 2005).

The feature point extraction unit 121 extracts feature points from the original image and the inspection target image. The feature point extraction unit 121 uses a specific object recognition algorithm to extract a coordinate for each feature point that significantly represents each image unique feature and a feature amount that is information associated with the feature points. By using a specific object recognition algorithm, the feature point extraction unit 121 can extract features that can compare the analogy of the appearance of the product captured in each image even when the shooting conditions, such as the position of the light source at the time of shooting and the shooting direction, are different between the images, or even when the sizes of the images are different.

For example, the feature point extraction unit 121 can utilize highly accurate KAZE (Reference 2: Alcantarilla P. F., Bartoli A., Davison A. J. (2012) KAZE Features, In Fitzgibbon A., Lazebnik. S., Perona P., Sato Y., Schmid C. (eds) Computer Vision-ECCV 2012. ECCV 2012. Lecture Notes in Computer Science, vol 7577. Springer, Berlin, Heidelberg) as the specific object recognition algorithm. Additionally, the feature point extraction unit 121 may utilize SIFT, SURF, ORB, BRISK, A-KAZE or the like as the specific object recognition algorithm.

Figure 2:
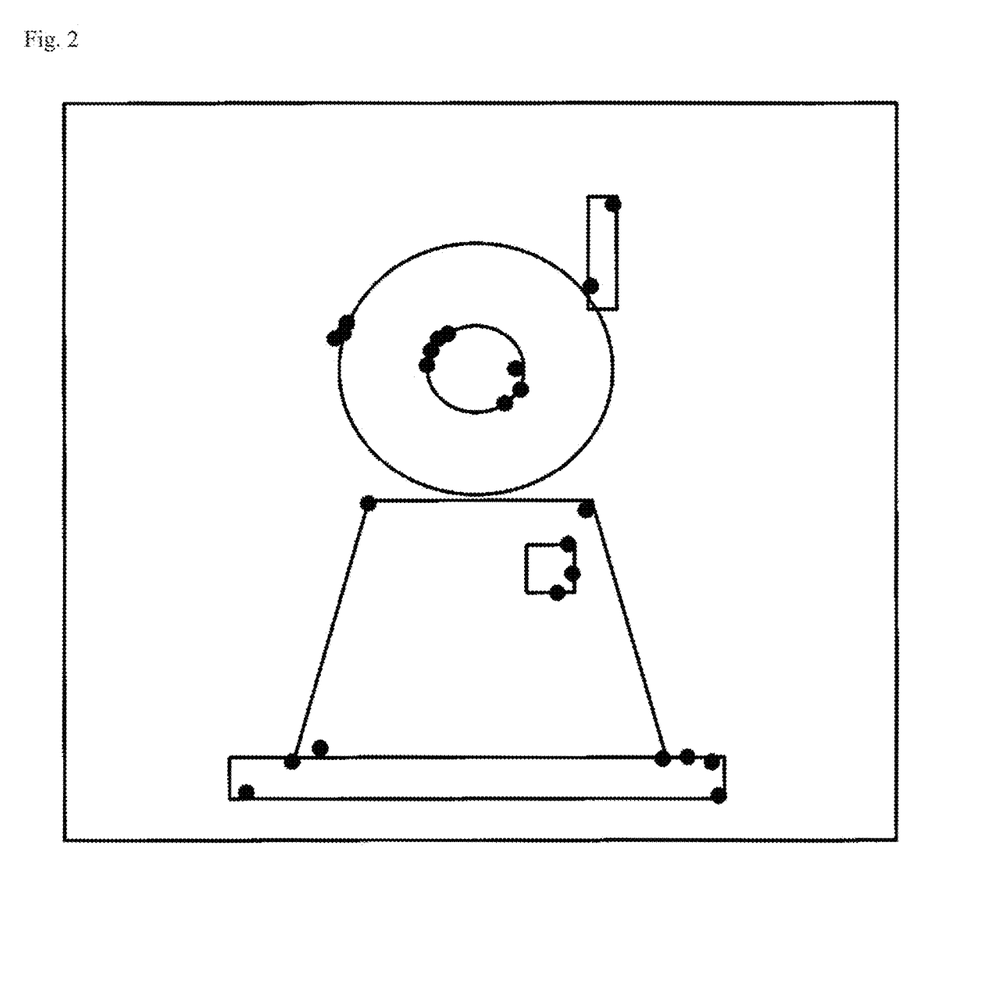
FIG. 2 is a diagram illustrating an example of feature points.

FIG. 2 is a diagram illustrating an example of the feature points. As illustrated in FIG. 2, the feature point extraction unit 121 uses a specific object recognition algorithm to extract a portion (e.g., an edge portion) or the like having a large change in density in the image as a feature point. In a case where a product is captured in an image, the portion of the product that is the outline of the object tends to be extracted as a feature point. Moreover, the number of extracted feature points may also vary depending on the image, For example, the feature amount is gradient information around the feature point, or the like.

FIG. 3 is a diagram illustrating an example of coordinates and feature amounts of feature points of the original image. Moreover, FIG. 4 is a diagram illustrating an example of coordinates and feature amounts of feature points of the inspection target image. FIGS. 3 and 4 illustrate the coordinates and feature amounts of the feature points of each image extracted by the feature point extraction unit 121 utilizing the KAZE. Its KAZE, the feature amount is generally expressed by a 64 dimensional feature vector.

The search unit 122 searches for sets of feature points in which feature amounts are similar to each other from among sets of feature points extracted from the original image and feature points extracted from the inspection target image. The search unit 122 calculates the distance between the feature points based on the feature amount (feature vector) of each image. Then, the search unit 122 searches for sets of mutually similar feature points based on the calculated proximity of distance. In the following description, the relationship of mutually similar feature points searched by the search unit 122 may be referred to as an analogy.

For example, among the feature points of the inspection target image, a feature point, which has the distance from a predetermined feature point of the original image is equal to or greater than a certain value, and the closest may be regarded as an analogous feature point by the search unit 122.

The search unit 122 can apply a distance suitable for each specific object recognition algorithm, such as a Manhattan distance, a Euclidean distance, or a Hamming distance, as the distance between the feature amounts. Furthermore, in addition to the aforementioned total search technique, the search unit 122 may also utilize k-neighborhood method algorithm (Reference 3: N. S. Altman, An introduction to kernel and nearest-neighbor nonparametric regression, The American Statistician, vol.46, issue.3, pp. 175-185, 1992) to search for analogous feature points at high speed.

Figure 5:
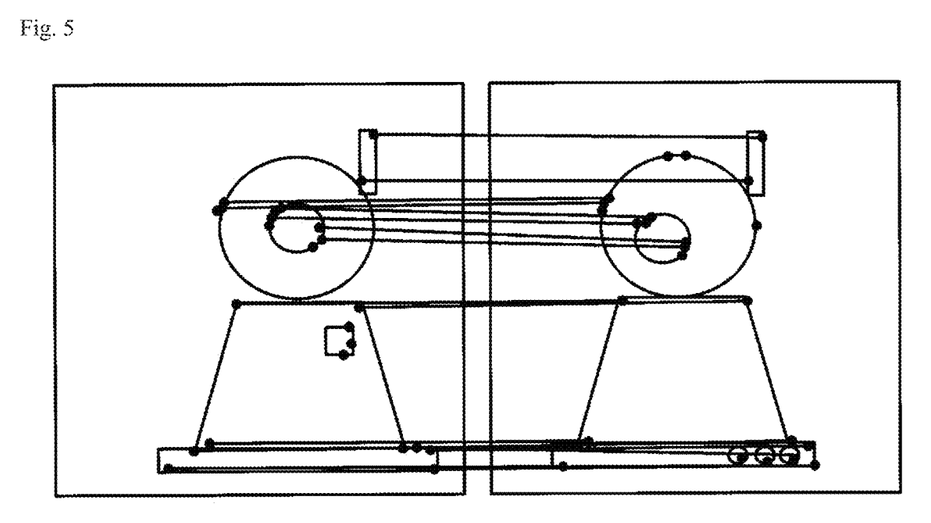
FIG. 5 is a diagram illustrating an example of analogous feature points.

FIG. 5 is a diagram illustrating an example of the analogous feature points. in FIG. 5, for the purposes of illustration, the analogous feature points searched by the search unit 122 are connected by lines. Moreover, FIG. 6 is a diagram illustrating an example of coordinates and feature amounts of analogous feature points. In the example of FIG. 6, a set of the 36th feature point of the original image and the 33rd feature point of the inspection target image is regarded as a set of analogous feature points by the search unit 122.

The first determination unit 123 determines whether or not the original image and the inspection target image are similar based on the feature points extracted from each of the original image and the inspection target image. The first determination unit 123 can make a determination based on a result of the search by the search unit 122. That is, the first determination unit 123 determines whether or not the original image and the inspection target image are similar based on a set of the feature points having similar feature amounts from among sets of feature points extracted from the original image and feature points extracted from the inspection target image.

More specifically, the first determination unit 123 determines that the original image and the inspection target image are similar in a case where the number of sets, in which the distance between the feature vectors of each feature point meets predetermined conditions, is equal to or greater than a threshold from among the sets of the feature points extracted from the original image and the feature points extracted from the inspection target image.

Figure 7:
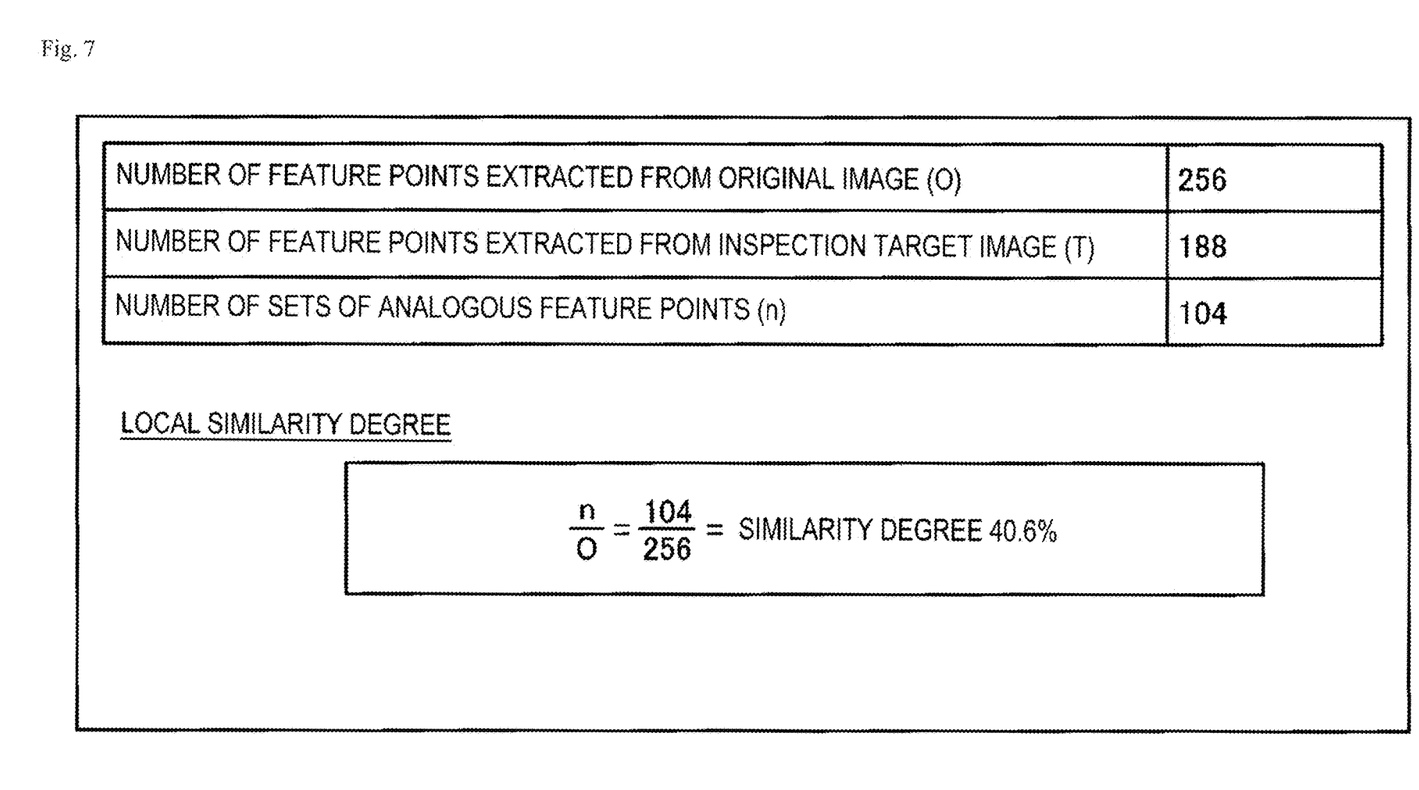
FIG. 7 is a diagram for explaining a method of calculating local similarity degree between images.

The first determination unit 123 makes a determination based on local similarity degree. FIG. 7 is a diagram for explaining a method of calculating the local similarity degree between images. Herein, the number of feature points extracted from the original image by the feature point extraction unit 121 is 256. Furthermore, the number of feature points extracted from the inspection target image by the feature point extraction unit 121 is 188. In addition, by searching with the search unit 122, the number of sets of feature points that are regarded to be analogous is 104.

At this time, the first determination unit 123 calculates the local similarity degree (the number of sets of feature points regarded to be analogous)/(the number of feature points extracted from the original image). Herein, the local similarity degree threshold is 40%, In the example of FIG. 7, because the local similarity degree is 40.6% and exceeds the threshold, the first determination unit 123 determines that the original image and the inspection target image are similar, In accordance with a determination of the local similarity determination unit 12 that the original image and the inspection target image are similar, the global similarity determination unit 13 further calculates a global similarity degree and determines whether or not the original image and the inspection target image are similar based on the global similarity degree.

The neighborhood graph generation unit 131 generates, for each of the original image and the inspection target image, a neighborhood graph with feature points regarded to be analogous by the search unit 122 as nodes. The neighborhood graph is a graph defined on a plane based on the proximity of points and, for a point set on the metric space, is an undirected graph in which a combination of neighborhood points is extracted using the point-to-point distance and the pair of points can be connected by the side.

Figure 8:
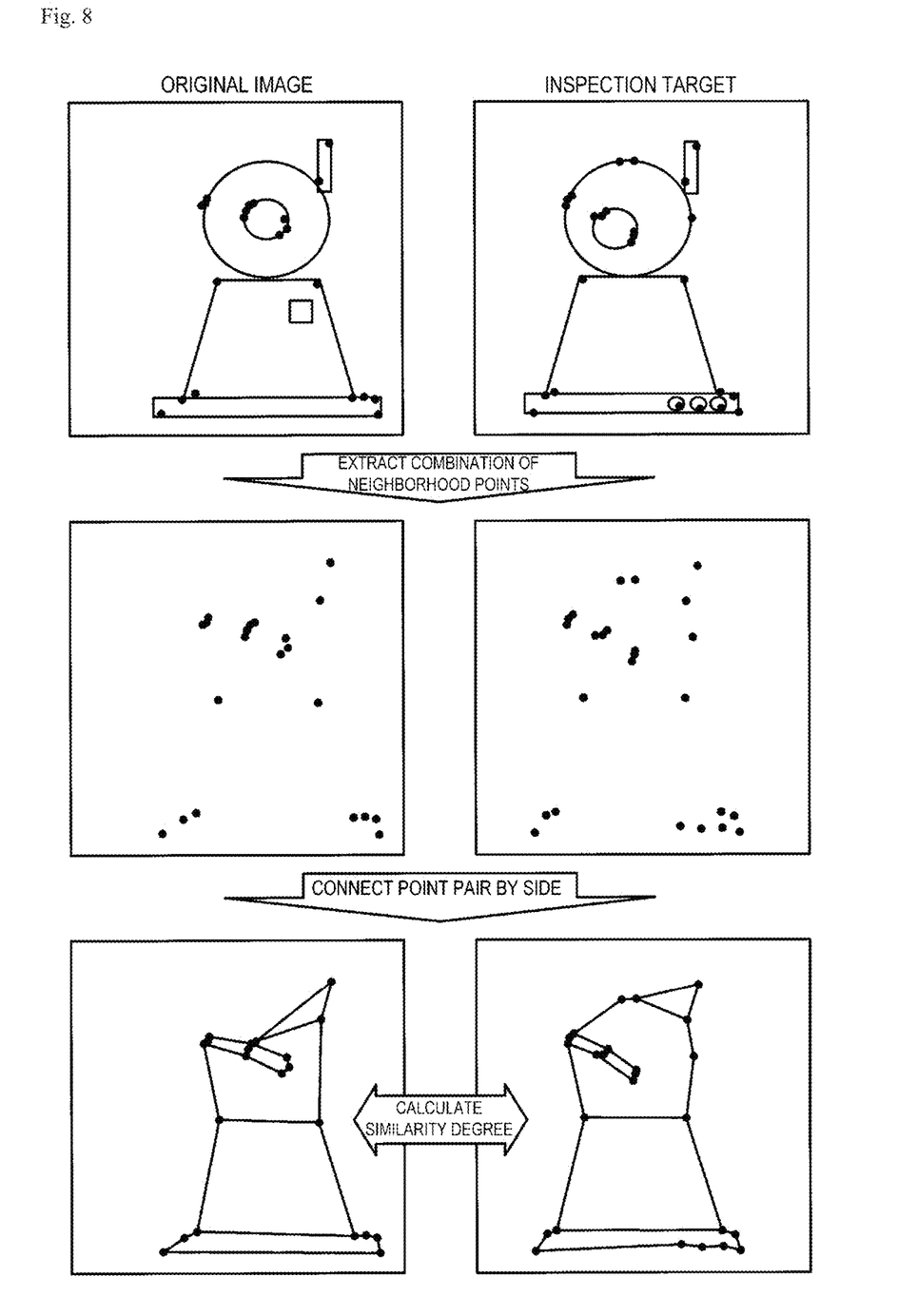
FIG. 8 is a diagram for explaining a neighborhood graph.

FIG. 8 is a diagram for explaining the neighborhood graph. As illustrated in FIG. 8, the neighborhood graph generation unit 131 extracts a combination of neighborhood points from analogous feature points of each image. Then, the neighborhood graph generation unit 131 generates a neighborhood graph in which a point pair of each neighborhood point is connected. with a side.

The neighborhood graph generation unit 131 can also generate a relative neighborhood graph (Reference 4: Toussaint, G. T.: The relative neighborhood graph of a finite planar set. Patte.$m$ Recognition, Vol. 12, No.4, pp. 261-268 (1980).). Moreover, the neighborhood graph generation unit 131 may also generate a Gabriel graph, a nearest neighborhood graph, a β-skeleton graph, or the like.

Figure 9:
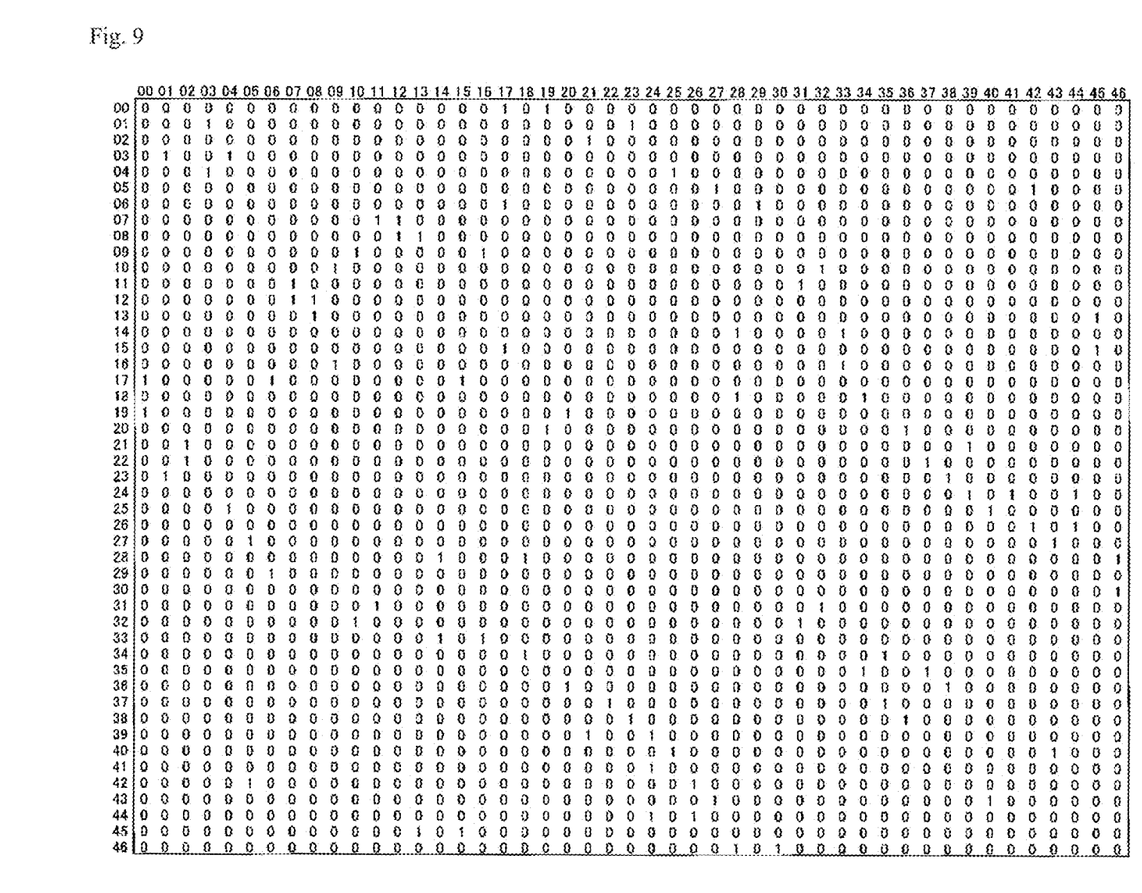
FIG. 9 is a diagram illustrating an example of an adjacency matrix representing a neighborhood graph.

The neighborhood graph is represented by adjacency matrix. FIG. 9 is a diagram illustrating an example of the adjacency matrix representing a neighborhood graph. In the example of FIGS. 8 and 9, the neighborhood graph is generated from 47 feature points. Rows and columns of the adjacency matrix correspond to the feature points of each image. Moreover, among the adjacency matrix values, one indicates that there is a side in the point pair, and 0 indicates that there is no side in the point pair.

The second determination unit 132 compares the neighborhood graphs, in which feature points are nodes, generated for each of the original image and the inspection target image to determine whether or not the original image and the inspection target image are similar. Moreover, in accordance with a determination of the first determination unit 123 that the original image and the inspection target image are similar, the second determination unit 132 determines whether or not the original image and the inspection target image are similar by comparing the neighborhood graphs with feature points included in the set in which the feature amounts are similar to each other, the feature points being nodes.

The second determination unit 132 can determine whether or not the original image and the inspection target image are similar based on the similarity degree calculated using the graph kernel of the neighborhood graph generated for the original image and the neighborhood graph generated for the inspection target image. The second determination unit 132 calculates a similarity degree based on the graph kernel of each image of as a global similarity degree and determines that the original image and the inspection target image are similar in a case where the global similarity degree exceeds a threshold.

The second determination unit 132 can use Shortest-Path Kernel (Reference 5: Karsten Borgwardt and Hans-Peter Kriegel. Shortest-path kernels on graphs. In Proceedings of the International Conference on Data Mining, pages 74-81, 2005.) as a graph kernel. Furthermore, the second determination unit 132 may use a Random Walk Kernel, Graphlet Count Kernel, Weisfeiler-Lehman Kernel or the like as a graph kernel.

In accordance with a determination that the original image and the inspection target image are similar, the second determination unit 132 regards the object captured in the inspection target image as a candidate for the OEM product of the original product and outputs information on the candidate for the OEM product.

Processing Flow

Figure 10:
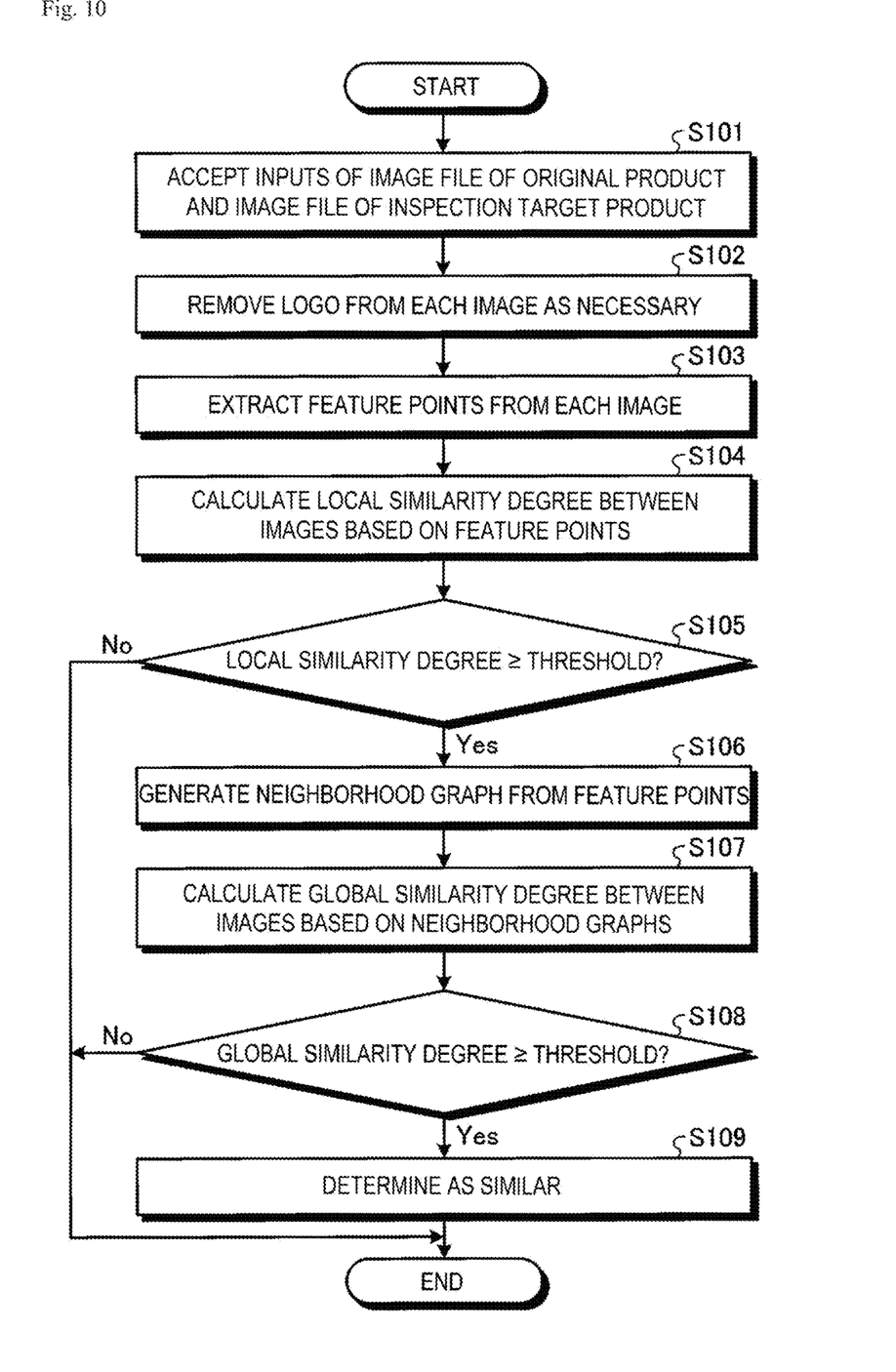
FIG. 10 is a flowchart illustrating an example of flow of process of the identification apparatus.

The flow of process of the identification apparatus 10 will be described using FIG. 10. FIG. 10 is a flowchart illustrating an example of the flow of the process of the identification apparatus. As shown in FIG. 10, first, the identification apparatus 10 accepts inputs of the image file of the original product and the image file of the inspection target product (Step S101). Herein, the identification apparatus 10 removes a logo from each image as necessary (Step S102).

Next, the identification apparatus 10 extracts the feature points from each image (Step S103). Then, based on the feature points, the identification apparatus 10 calculates a local similarity degree between the images (Step S104). Herein, the identification apparatus 10 determines whether or not the local similarity degree is equal to or greater than the threshold (Step S105). In a case where the local similarity degree is not equal to or greater than the threshold value (Step S105, No), the identification apparatus 10 does not regard the inspection target as the OEM product, and the process ends.

On the other hand, in a case where the local similarity degree is equal to or greater than the threshold (Step S105, Yes), the identification apparatus 10 generates a neighborhood graph from the extracted feature points (Step S106). The identification apparatus 10 calculates, based on the neighborhood graphs, a global similarity degree between the images (Step S107). Herein, the identification apparatus 10 determines whether or not the global similarity degree is equal to or greater than the threshold (Step S108). In a case where the global similarity degree is not equal to or greater than the threshold (Step S108, No), the identification apparatus 10 does not regard the inspection target as an OEM product, and the process ends.

On the other hand, in a case where the global similarity degree is equal to or greater than the threshold (Step S108, Yes), the identification apparatus 10 determines that the product captured in the original image and the product captured in the inspection target image are similar (Step S109). That is, the identification apparatus 10 determines that the product captured in the inspection target image is an OEM product.

Advantages

As described above, the first determination unit 123 determines whether or not the original image and the inspection target image are similar based on the feature points extracted from each of the original image and the inspection target image. The second determination unit 132 compares the neighborhood graphs, in which feature points are nodes, generated for each of the original image and the inspection target image to determine whether or not the original image and the inspection target image are similar. In this way, the identification apparatus 10 can automatically determine whether or not the inspection target product and original product are similar based on the inputted images. Since the OEM product is often similar in appearance to the original product, the identification apparatus 10 of the present example can efficiently identify the OEM product.

Moreover, the first determination unit 123 can determine whether or not the original image and the inspection target image are similar based on the set of the feature points having similar feature amounts from among sets of feature points extracted from the original image and feature points extracted from the inspection target image. In this case, in accordance with a determination of the first determination unit 123 that the original image and the inspection target image are similar, the second determination unit 132 determines whether or not the original image and the inspection target image are similar by comparing the neighborhood graphs with feature points included in the set in which the feature amounts are similar to each other, the feature points being nodes. In this way, the identification apparatus 10 makes two steps of determination, which are the local similarity determination and the global similarity determination. As a result, according to the identification apparatus 10 of the present embodiment, the process for similarity determination can be efficient.

In addition, the first determination unit 123 can determine that the original image and the inspection target image are similar in a case where the number of sets, in which the distance between the feature vectors of each feature point meets predetermined conditions, is equal to or greater than a threshold from among the sets of the feature points extracted from the original image and the feature points extracted from the inspection target image. In this way, the identification apparatus 10 calculates the similarity degree for each feature point. As a result, according to the identification apparatus 10 of the present embodiment, local similarity degree determination can be made.

The second determination unit 132 determines whether or not the original image and the inspection target image are similar based on the similarity degree calculated using the graph kernel of the neighborhood graph generated for the original image and the neighborhood graph generated for the inspection target image. In this way, the identification apparatus 10 can make determination based on the structural similarity degree using the neighborhood graphs, As a result, according to the identification apparatus 10 of the present embodiment, determination of the global similarity degree can be made.

The removal unit 11 removes a logo of the predetermined product captured in the image from at least one of the original image or the inspection target image. It is believed that in the original products and the OEM products, the brand logos assigned to each are often different. Therefore, in order to accurately identify the OEM product, it is believed that the logo portion is ignored, and only focus on the object appearance of the product so that the accuracy is improved. Thus, according to the identification apparatus 10 of the present embodiment, it is possible to remove a logo from the images and improve the identification accuracy of the OEM products.

Moreover, the removal unit 11 removes the logo for both the original image and the inspection target image by masking a region that is recognized to have a logo with an image of a predetermined size that is aligned with the region. Thus, according to the identification apparatus 10 of the present embodiment, it is possible to remove a logo from the images and improve the identification accuracy of the OEM products. Furthermore, the portion where the logo was present is masked by a common image, and therefore, a reduction in the identification accuracy is suppressed.

Note that it is believed that there are different colors of paint or pattern addition to the original product in the OEM product. Thus, the removal unit 11 may further remove the pattern or color drawn on the product in addition to the logo. For example, the removal unit 11 may convert the image of the color into a black and white binary image to remove color. Moreover, the removal unit 11 may generate an image in which only the outline of the object captured in the image has been extracted.

System Configuration and the Like

Further, each component of each of the illustrated apparatuses is configured with a functional concept and does not necessarily have to be physically configured as illustrated in the drawing. That is, the specific form of distribution and integration of each apparatus is not limited to the one illustrated in the drawing and all or part of them can be functionally or physically distributed or integrated in arbitrary units according to various loads, usage conditions, and the like. Further, all or some of processing functions performed by each apparatus may be implemented by a central processing unit (CPU) and a program analyzed and executed by the CPU, or may be implemented as hardware by wired logic.

In addition, all or some of the processes described as being performed automatically among the processes described in this embodiment can be performed manually, or all or some of the processes described as being performed manually can be performed automatically by a known method. Further, the processing procedures, the control procedures, the specific names, and information including various data and parameters described in the specification or shown in the drawings may be arbitrarily changed except for specified cases.

Program

As an embodiment, the identification apparatus 10 can be implemented by installing information distribution program executing the above-described information distribution processing in a desired computer as packaged software or online software. For example, the information processing apparatus can be made to function as the identification apparatus 10 by causing the information processing apparatus to execute the above-described information distribution program. Here, the information processing apparatus includes a desktop or laptop personal computer. In addition, as the information processing apparatus, a mobile communication terminal such as a smart phone, a mobile phone, and a Personal Handyphone System (PHS), or a smart terminal such as Personal Digital Assistant (PDA) are included in the category.

In addition, the identification apparatus 10 can be implemented as an information distribution server apparatus that has a terminal device used by a user as a client and provides service related to the information distribution processing for the client. For example, the information distribution server apparatus is implemented as a server apparatus that provides information distribution service in which graph data is input and graph signal processing or an analysis result of graph data is output. In this case, the information distribution server apparatus may be implemented as a web server or may be implemented as a cloud that provides service related to the above-described information distribution processing by outsourcing.

Figure 11:
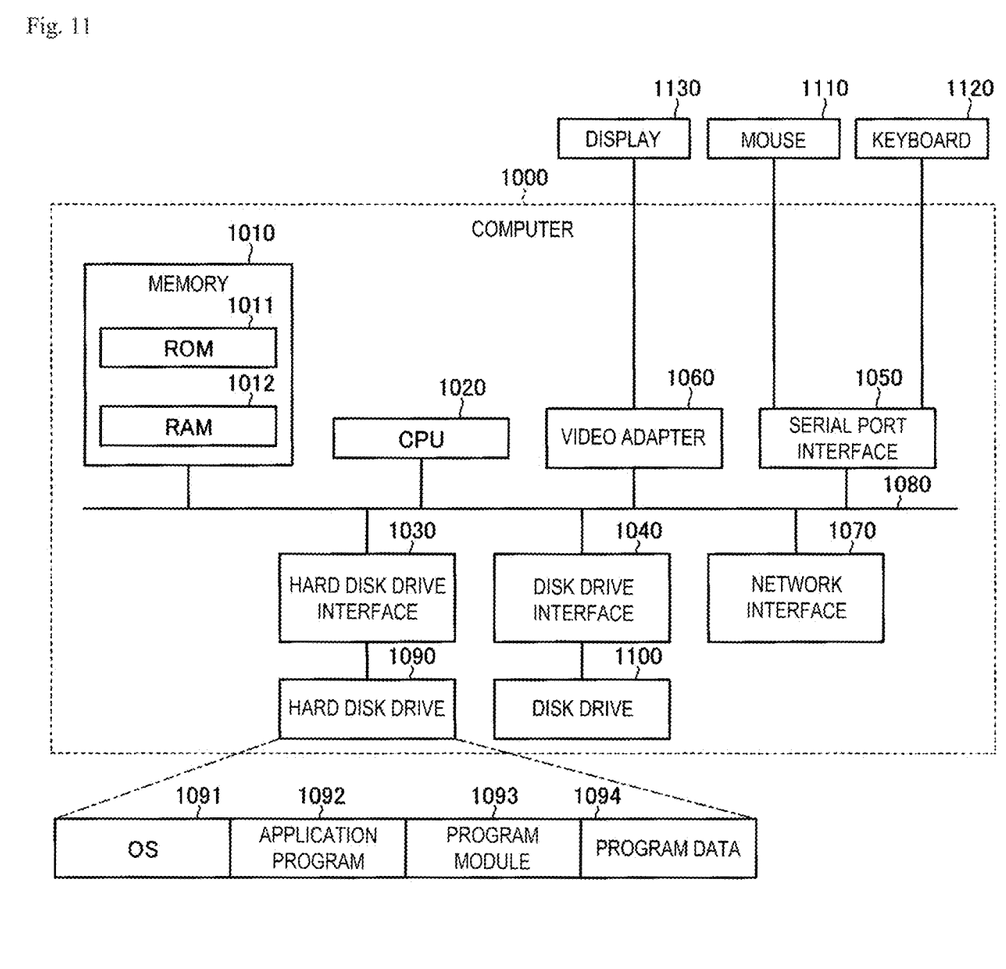
FIG. 11 is a diagram illustrating a configuration example of a computer.

FIG. 11 is a diagram illustrating an example of a computer executing an information distribution program. The computer 1000 has, for example, a memory 1010 and a CPU 1020. The computer 1000 has a hard disk drive interface 1030, a disk drive interface 1040, a serial port interface 1050, a video adapter 1060, and a network interface 1070. These components are connected by a bus 1080.

The memory 1010 includes a read only memory (ROM) 1011 and a random access memory (RAM) 1012. The ROM 1011 stores a boot program such as, for example, a basic input output system (BIOS). The hard disk drive interface 1030 is connected to a hard disk drive 1090. The disk drive interface 1040 is connected to a disk drive 1100. A removable storage medium such as, for example, a magnetic disc or an optical disc is inserted into the disk drive 1100. The serial port interface 1050 is connected, fix example, to a mouse 1110 and a keyboard 1120. The video adapter 1060 is connected, for example, to a display 1130.

The hard disk drive 1090 stores, for example, an OS 1091, an application program 1092, a program module 1093, and program data 1094. That is, a program defining each processing of the identification apparatus 10 is implemented as a program module 1093 in which a computer executable code is described. The program module 1093 is stored in, for example, the hard disk drive 1090. For example, the program module 1093 for executing the same process as that performed by the functional configuration in the identification apparatus 10 is stored in the hard disk drive 1090. The hard disk drive 1090 may be replaced with an SSD.

Further, setting data used in the process of the embodiment described above is stored as the program data 1094 in the memory 1010 or the hard disk drive 1090, for example.

The CPU 1020 reads the program module 1093 and the program data 1094 stored in the memory 1010 and the hard disk drive 1090 into the RAM 1012 as necessary, and executes the processing of the above-described embodiments.

The program module 1093 and the program data 1094 are not necessarily stored in the hard disk drive 1090, and may be stored in, for example, a removable storage medium and be read out by the CPU 1020 through the disk drive 1100 or the like. For example, the program module 1093 and the program data 1094 may be stored in another computer connected via a network (such as a local area network (LAN) or a wide area network (WAN)). Alternatively, the program module 1093 and the program data 1094 may be read out from another computer by the CPU 1020 via the network interface 1070,

REFERENCE SIGNS LIST

10 Identification apparatus
11 Removal unit
12 Local similarity determination unit
13 Global similarity determination unit
121 feature point extraction unit
122 Search unit
123 First determination unit
131 Neighborhood graph generation unit
132 Second determination unit

The invention claimed is:

1. An identification apparatus comprising:
processing circuitry configured to:
perform a local determination of whether or not a first image and a second image satisfy a predetermined similarity requirement based on feature points extracted from each of the first image and the second image;
upon determining that the first image and the second image satisfy the predetermined similarity requirement, perform a global determination of whether or not the first image and the second image satisfy another predetermined similarity requirement by comparing neighborhood graphs generated for each of the first image and the second image, the feature points being nodes on the neighborhood graphs; and
output a determination that the first image and the second image are substantially the same when the local determination indicates that the first image and the second image satisfy the predetermined similarity requirement and the global determination indicates that the first image and the second image satisfy the other predetermined similarity requirement.

2. The identification apparatus according to claim 1, wherein the processing circuitry is further configured to:
perform the local determination of whether or not the first image and the second image satisfy the predetermined similarity requirement based on a set of feature points that are the same in feature amounts from among sets of feature points extracted from the first image and feature points extracted from the second image, and
in accordance with a local determination that the first image and the second image satisfy the predetermined similarity requirement, perform the global determination of whether or not the first image and the second image satisfy the other predetermined similarity requirement by comparing neighborhood graphs with feature points included in a set in which the feature amounts are the same, the feature points being nodes on the neighborhood graphs.

3. The identification apparatus according to claim 1, wherein the processing circuitry is further configured to, in the local determination, determine that the first image and the second image satisfy the predetermined similarity requirement in a case where a number of sets, in which a distance between feature vectors of each feature point meets a predetermined condition, is equal to or greater than a threshold from among sets of the feature points extracted from the first image and the feature points extracted from the second image.

4. The identification apparatus according to claim 3, wherein the feature vectors are 64 dimensional feature vectors.

5. The identification apparatus according to claim 1, wherein the processing circuitry is further configured to perform the global determination of whether or not the first image and the second image satisfy the other predetermined similarity requirement based on a similarity degree calculated using a graph kernel of a neighborhood graph generated for the first image and a neighborhood graph generated for the second image.

6. The identification apparatus according to claim 1, wherein the processing circuitry is further configured to remove a logo of a predetermined product captured in an image from at least one of the first image or the second image.

7. The identification apparatus according to claim 6, wherein the processing circuitry is further configured to remove a logo for both the first image and the second image by masking a region that is recognized to have the logo with an image of a predetermined size aligned with the region.

8. The identification apparatus according to claim 6, wherein the processing circuitry is configured to remove the logo prior to determining whether or not the first image and the second image are similar.

9. The identification apparatus according to claim 1, wherein the processing circuitry is configured to extract the set of feature points based on density differences in the first image and the second image.

10. The identification apparatus according to claim 9, wherein the density differences in the first image and the second image identify edges.

11. The identification apparatus according to claim 1, wherein the neighborhood graphs are represented as adjacency matrices in which the rows and columns represent the nodes.

12. The identification apparatus according to claim 11, wherein adjacency between two nodes in the adjacency matrix is represented by a first value and non-adjacency between two nodes in the adjacency matrix is represented by a second value.

13. The identification apparatus according to claim 12, wherein the first value is one and the second value is zero.

14. The identification apparatus according to claim 1, wherein the processing circuitry indicates that the first image and the second image are not substantially the same when at least one of the local determination indicates that the first image and the second image do not satisfy the predetermined similarity requirement or the global determination indicates that the first image and the second image do not satisfy the other predetermined similarity requirement.

15. An identification method comprising:
performing a local determination of whether or not a first image and a second image satisfy a predetermined similarity requirement based on feature points extracted from each of the first image and the second image, by processing circuitry;
upon determining that the first image and the second image satisfy the predetermined similarity requirement, performing a global determination of whether or not the first image and the second image satisfy another predetermined similarity requirement by comparing neighborhood graphs generated for each of the first image and the second image, the feature points being nodes on the neighborhood graphs; and
outputting a determination that the first image and the second image are substantially the same when the local determination indicates that the first image and the second image satisfy the predetermined similarity requirement and the global determination indicates that the first image and the second image satisfy the other predetermined similarity requirement.

16. A non-transitory computer-readable recording medium storing therein an identification program that causes a computer to execute a process comprising:
performing a local determination of whether or not a first image and a second image satisfy a predetermined similarity requirement based on feature points extracted from each of the first image and the second image;
upon determining that the first image and the second image satisfy the predetermined similarity requirement, performing a global determination of whether or not the first image and the second image satisfy another predetermined similarity requirement by comparing neighborhood graphs generated for each of the first image and the second image, the feature points being nodes on the neighborhood graphs; and
outputting a determination that the first image and the second image are substantially the same when the local determination indicates that the first image and the second image satisfy the predetermined similarity requirement and the global determination indicates that the first image and the second image satisfy the other predetermined similarity requirement.

* * * * *